D. MYERS.
Car Brake.

No. 37,238. Patented Dec. 23, 1862.

Witnesses:

Inventor:

UNITED STATES PATENT OFFICE.

D. MYERS, OF SOUTH BEND, INDIANA.

IMPROVEMENT IN RAILROAD-CAR BRAKES.

Specification forming part of Letters Patent No. 37,238, dated December 23, 1862.

*To all whom it may concern:*

Be it known that I, D. MYERS, of South Bend, St. Joseph county, Indiana, have invented certain Improvements in Railway-Car Brakes; and I do hereby declare the following to be a full, clear, and exact description of the same, reference being had to the accompanying drawings, and to the letters of reference marked thereon.

My invention consists of certain mechanism, fully described hereinafter, for readily applying the brakes to all the wheels of a train of cars from the tender or first car of the train, thereby avoiding the usual expensive plan of stationing a brakeman on each car.

In order to enable others to make and use my invention, I will now proceed to describe its construction and operation.

Figure 1:
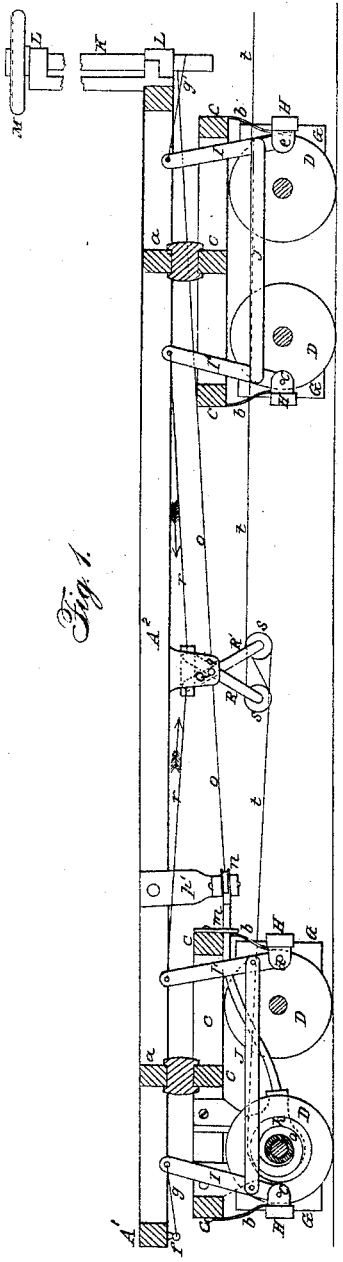
Figure 2:
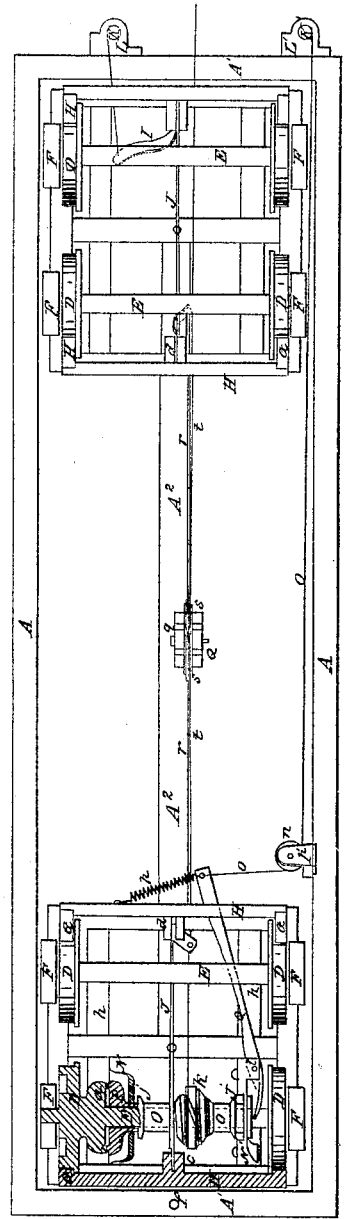

On reference to the accompanying drawings, Figure 1 is a sectional elevation showing the method of applying my improved brake to the trucks of a common railway-car; Fig. 2, an inverted plan view, partly in section.

Similar letters refer to similar parts throughout the several views.

A A are the side beams, A' A' the end beams, A'' the center beam, and *a a* the cross-beams, forming together the frame of a railway-car. C C are the beams forming the truck-frames, each frame carrying the usual wheels, D, on axles E, the ends of which turn in appropriate boxes in the brackets F. Suitable rubbers, G, are attached to the ends of bars H, the latter being suspended from the truck-frame in front of the wheels by means of curved springs *b*.

To a slotted projection, *c*, on the inside of the bar H of the forward truck of the car is jointed the lower end of the lever I, and to a similar projection, *d*, on the opposite bar H of the same truck is jointed the lower end of the lever I', a cross-piece, J, being hinged at one end to the lever I and at the other end to the lever I'. Similar levers arranged in a like manner are arranged on the rear truck of the car.

To a staple, *f*, on the front beam, A', of the car is attached one end of a chain, *g*, the other end of which is fastened to the upper end of the lever I of the forward truck. A similar chain, *g'*, is attached to the upper end of the lever I' of the rear truck, the other end of the chain being secured to a vertical rod, K, which is arranged to turn in brackets L, projecting from the rear of the car-frame, the top of the rod being provided with a suitable hand-wheel, M.

From supplementary beams *h h*, secured to the forward truck, depend brackets N N', in which turns the sleeve O, surrounding the axle E of the front wheels, the opening through the sleeve being of sufficient size to allow the axle to turn freely in it without contact. To one end of the sleeve is secured a disk, P, on the face of which is formed an annular V-shaped ridge, *i*, which coincides with a similarly-shaped depression formed in a projection, *e*, on the inner side of the wheel D.

At or near the center of the sleeve O is formed an enlargement or pulley, *k*, with beveled sides, in each of which is cut a spiral groove, and at a short distance from each end of the sleeve is formed a collar, *j*. To the edge of the grooved pulley *k*, near the commencement of one of the spiral grooves, is secured a staple, *n*, another staple being secured to the pulley at the commencement of the other spiral groove.

To a pin, *l*, which passes through a projection on the bracket N', is hung the lever Q, the shorter arm of which is forked so as to embrace the axle and bear against the end of the sleeve O. The long arm of this lever Q passes through a slot in a plate, *m*, secured to the rear beam of the truck, and to the end of this arm of the lever is fastened one end of a coiled spring, *p*, which is attached at the other end to the truck. A chain, *o*, is also attached to this arm of the lever, and passes over a pulley, *n*, turning in a bracket, *p'*, secured to the side beam of the car, the other end of the chain being secured to a rod, K', revolving in brackets L' at the end of the car, the upper end of the rod being provided with a suitable hand-wheel. A bracket, Q', depends from the center beam, A², and to a pin, *q*, passing through this bracket, are hung the levers R and R', which cross each other in the manner represented in the drawings. To the upper end of the lever R is attached one end of a rod or chain, *r*, which is connected to the upper end of the lever I of the rear truck. A rod attached to the lever R' is connected in like manner to the lever I' on the forward truck. The lower ends of these levers R and R' are provided with grooved pulleys *s*, around which passes in the manner represented the chain t, which is secured at one end to a ring on the staple n of the grooved pulley k, the other end being attached to a chain, which passes over the pulleys of similar levers, R and R', hung to the next car of the train, the extreme end of the chain being secured to a staple at the rear of the last car of the train. The operating-gear, consisting of the sleeve O and appliances connected therewith, is supposed to be attached to the tender or first car of the train only, all the cars, however, being provided with levers R and R', chains t, levers I, &c.

When it is desired to apply the brakes to the wheels, the hand-wheel of the rod K' is turned so as to wind up the chain o, and through the action of the lever Q force forward the sleeve O and bring the face of the disk P against the face of the projection e, the friction between the surfaces being sufficient to cause the sleeve O to rotate in the same direction as the axle E. As the sleeve O rotates, the chain t is wound around the grooved pulley k and around the sleeve, from the end of which it cannot escape, owing to the flanges i. The tightening of the chain causes each pair of levers R and R' throughout the train to tend to assume a position parallel with each other, and by this action draw the rods r in the direction of their arrows, and through the levers I force the rubbers against the wheels. When the chain t is first coiled around the sleeve, it will take its place in the grooves of the pulley k, where the latter has the largest diameter. The slack of the chain will thus be quickly taken up in the first instance; but as the winding is continued the chain follows the grooves of the pulley, where the latter has a smaller diameter, and, as the tension increases, it is applied more gradually, thus lessening the danger of breaking the chain, and at the same time preventing a too sudden and determined application of the brakes. After a certain tension has been reached, varying in proportion to the force with which the lever Q bears upon the end of the sleeve, the friction between the faces of the plates P and e will not be sufficient to overcome the force exerted on the chain to prevent the rotation of the sleeve, which will be held stationary while the wheel and axle revolve. To prevent too great a pressure being applied to the lever Q, which could cause the sleeve to rotate until the chain would break, the movement of the lever is limited by the sides of the slot in the plate m, the amount of pressure applied, however, being generally determined by the judgment of the brakeman. It will be seen that the staple n on the drum k is so placed that when the car moves forward the ring on the end of the chain will slip to the end of the staple, and the chain be guided so as to enter the spiral groove on one side of the pulley k, and that when the car moves back the ring will slip to the other end of the staple and the chain be brought over the beginning of the spiral groove and wound on the other side of the pulley. The chain is thus effectually prevented from becoming entangled when the motion of the car is suddenly reversed.

I claim as my invention and desire to secure by Letters Patent—

1. Applying the rubbers to the wheels of a train of cars by means of suitable rods or chains and levers, and a sleeve surrounding one of the axles of the tender or one of the axles of the first car of the train, when a pulley, K, with beveled edges, each edge having a spiral groove, is formed on the said sleeve, as set forth, for the purpose specified.

2. The levers R and R', their pulleys s s, and chains t and r, the whole being arranged and operating in conjunction with the brake-levers I and I', substantially as and for the purpose herein set forth.

In testimony whereof I have signed my name to this specification in the presence of two subscribing witnesses.

D. MYERS.

Witnesses:
A. S. DUNBAR,
L. N. MYERS.